Feb. 2, 1954 R. M. TENNEY ET AL 2,667,758
EGG STORAGE COMPARTMENT FOR REFRIGERATORS
Filed April 11, 1951 2 Sheets-Sheet 2
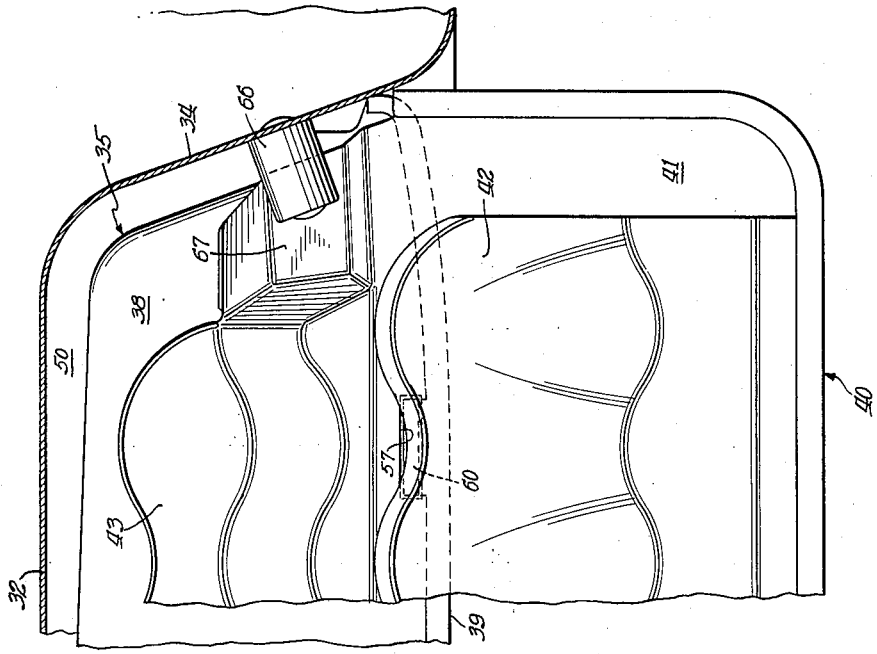
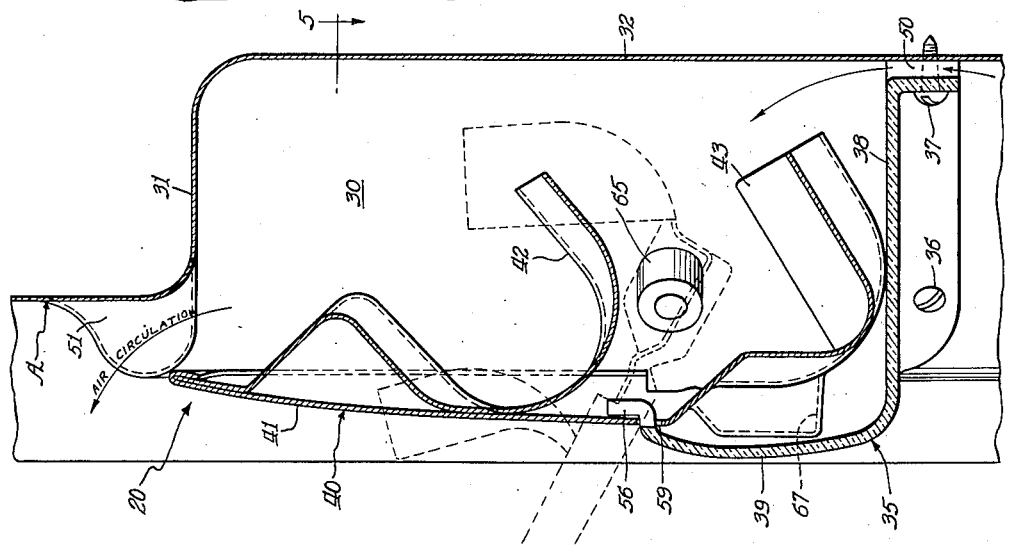
Inventors:
Raymond M. Tenney
James R. Hornaday and
Donald H. Reeves Patented Feb. 2, 1954

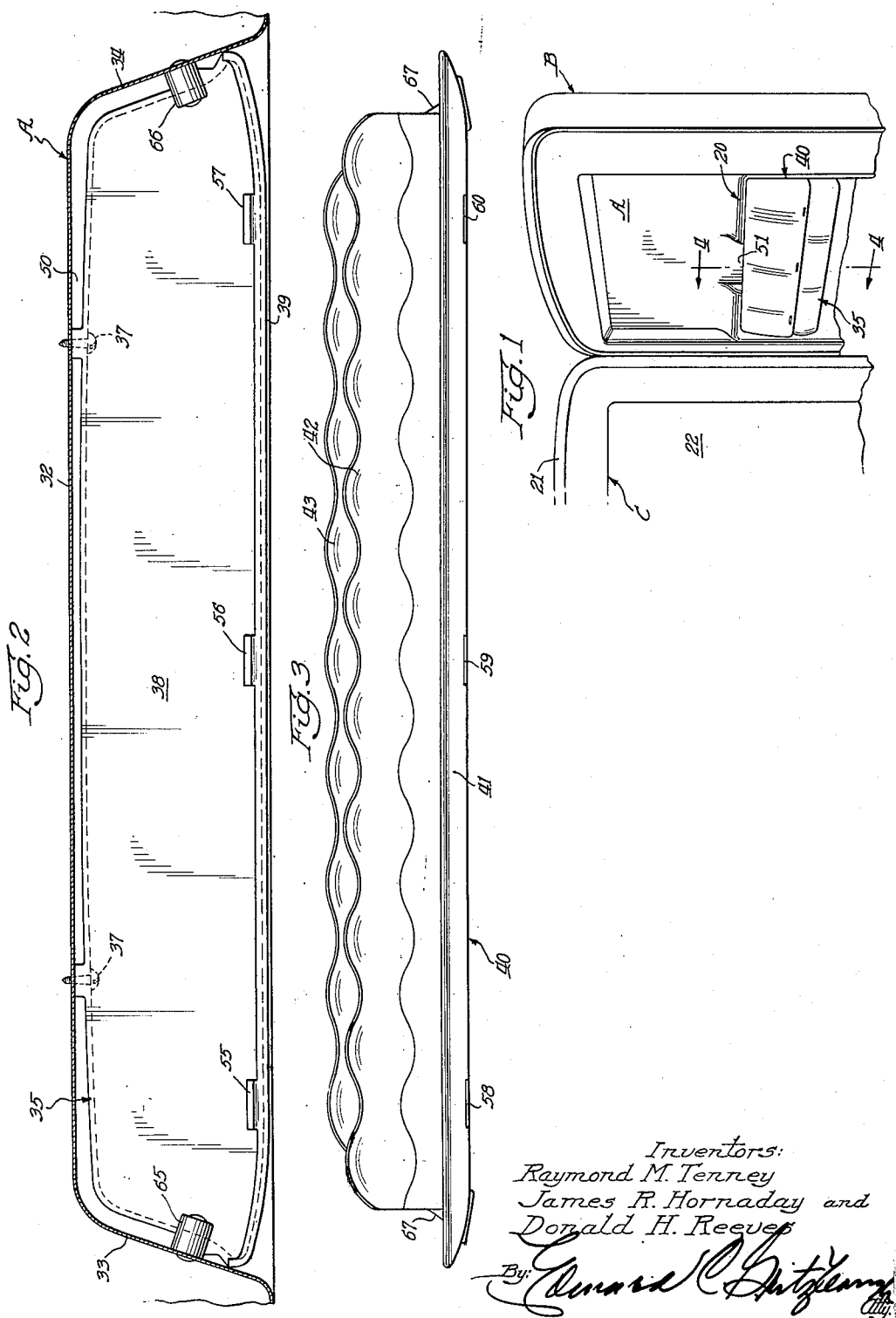

2,667,758

UNITED STATES PATENT OFFICE 2,667,758

EGG STORAGE COMPARTMENT FOR REFRIGERATORS

Raymond M. Tenney, Wilmette, Ill., and James R. Hornaday and Donald H. Reeves, North Muskegon, Mich., assignors to Borg-Warner Corporation, Chicago, Ill., a corporation of Illinois Application April 11, 1951, Serial No. 220,472

6 Claims. (Cl. 62—89)

This invention relates to an egg storage compartment particularly adapted for employment in a refrigerator.

Otherwise stated, the invention is embodied in an egg storage compartment for a refrigerator and has certain novel and useful characteristics whereby the eggs stored therein are afforded safety from breakage and are maintained at a proper temperature.

More specifically stated, it is a general object and accomplishment of the invention to provide an egg storage compartment preferably for disposition on the inner panel of a refrigerator food compartment door and including a tray conveniently and easily removable from said compartment and particularly adapted to support a plurality of eggs in relative nested relationship, said tray having portions thereof adapted as a closure means for said compartment, and said compartment having means whereby circulated refrigerated air may be caused to flow through said compartment and in contact with the eggs disposed therein, thereby to provide proper cooling of said eggs.

Another aspect of the invention is to provide an egg supporting tray normally disposed in the food compartment of a refrigerator but being adapted for easy and convenient removal therefrom to a worktable while maintaining said eggs from breakage and supporting the same for convenient access until they are used.

Another purpose of this invention is to provide a removable egg tray supported by a member secured to the refrigerator door, said member being of such form as to be usable as a shelf when the egg tray is removed.

An ancillary object and accomplishment of the invention is to provide a new and improved egg storage compartment for a refrigerator and which is adapted to be economically manufactured and which is so designed as to permit the manufacture and assembly thereof in accordance with present day large scale mass production manufacturing methods of construction and assembly.

Additional objects, features and advantages of the invention disclosed herein will be apparent to persons skilled in the art after the construction and operation are understood from the within description.

One embodiment of the invention is illustrated in the accompanying drawings forming a part hereof and wherein like reference characters identify the same parts in the several views, and wherein:

Fig. 1 is a fragmentary perspective view of a refrigerator and its component food compartment door shown in open position and illustrating the incorporation in said compartment door of an egg storage compartment embodying the features of the present invention;

Fig. 2 is a plan view of the egg storage compartment depicted in Fig. 1 with portions thereof shown in section to more clearly illustrate the construction thereof;

Fig. 3 is a top plan view of the egg supporting tray adapted to be received into, and portions of which form a closure for, said egg storage compartment depicted in Fig. 2;

Fig. 4 is a sectional view taken substantially on the plane of the line 4—4 in Fig. 1 and illustrating the relative disposition of the parts of said egg storage compartment and the egg supporting tray, the structure of said tray in full lines illustrating the tray in its closed position, and the structure of said tray in dotted lines illustrating the tray in its open position where the eggs may be conveniently removed from the compartment; and Fig. 5 is a fragmentary plan view of the egg storage compartment and said egg supporting tray, this view being taken substantially on the plane of the line 5—5 in Fig. 4 and illustrating the relative disposition of the parts of said egg storage compartment and said tray when the tray is in its open position.

The drawings are to be understood as being more or less of a schematic character for the purpose of illustrating and disclosing a typical or preferred form of the improvements contemplated herein.

Referring to the drawings, particularly Fig. 1, we have illustrated the egg storage compartment with which the present invention is particularly concerned and designated in its entirety by the numeral 20, as being adjunctively employed, for example, to the inner panelled surface A of a food compartment door B of a refrigerator C.

The refrigerator C may comprise the conventional casing 21 adapted to enclose and define a food storage compartment 22 having as its closure means the food compartment door B which is provided with the inner panelled surface A adapted to incorporate the egg storage compartment 20.

Suffice it to say, since the invention is not particularly concerned with the precise construction of the refrigerator cabinet C and its component parts A and B, they will not be further described in detail, and it is deemed sufficient for all intentions and purposes herein contained to show only portions thereof adjacent to and cooperating with the egg storage compartment 20 contemplated herein. It is to be understood that details of construction of such refrigerator C and its component parts as at A and B may be modified to suit particular conditions, and we do not wish to be limited to the construction of these elements as set forth except where such construction particularly concerns the invention contemplated herein.

Having thus described, by way of example, a possible adaptation of the egg storage compartment 20, and having described the general environment surrounding the adaptation, the specific construction and cooperating functions of the parts of said egg storage compartment with which the present invention is particularly concerned, will now be described in detail.

In the exemplary embodiment of the invention depicted in Figs. 2, 3, 4 and 5, the egg storage compartment 20 with which the present invention is particularly concerned comprises, in general, a chamber 30 defined by a top wall 31, a rear or inner wall 32 and side walls 33 and 34 each forming an integral part of the panelled inner liner A of the food compartment door B, a shelf-like structure indicated in its entirety by the numeral 35 and removably carried by the walls 32, 33 and 34 in spaced relationship therewith by virtue of securing means such as screws 36 and 37, said shelf-like structure defining a bottom wall 38 of the compartment 30 and comprises a front panelled wall 39 extending upwardly from said bottom wall 38 and adapted to partially enclose the compartment 30, and a tray designated in its entirety by the numeral 40 and hingedly carried by said wall 39 and provided with a wall 41 adapted as a closure means for the compartment 30 when in a position illustrated in full lines in Fig. 4, said tray being conveniently and easily removable from its hinged position and being adapted to support in racks 42 and 43 a plurality of eggs in relative nested relationship.

Attention is directed to Figs. 2 and 4 wherein the shelf-like structure 35 is shown secured to the walls 32, 33 and 34 of the compartment 30 in spaced relationship thereto, the space between these elements being indicated by the numeral 50 and being adapted to provide a means for circulation of refrigerated air from the food storage compartment of the refrigerator C to and from the compartment 30 as indicated by the arrows in Fig. 4. The recess 51 best seen in Figs. 1 and 4 has a two-fold purpose of providing a hand grip for the tray 40 and also providing a channel through which refrigerated air may circulate in cooperation with the air channel defined by the space 50.

Attention is invited to Fig. 4 which discloses the tray 40 in its hinged relationship with respect to the shelf-like structure 35, the hinged relationship being accomplished by the provision of tongues 55, 56 and 57 integrally formed as a part of the shelf-like structure 35 and projecting upwardly therefrom and adapted respectively to be received into apertures 58, 59 and 60 which are cut into the wall 41 of the tray 40. The dotted line position of the tray 40 shown in Fig. 4 illustrates the open position of the tray where the eggs can be conveniently removed from the racks 42 and 43.

In the event that the housewife desires to remove the tray 40 from its hinged position it is necessary for her to position the tray substantially as shown in dotted lines in Fig. 4 and lift the entire structure upwardly slightly whereupon the tongues 55, 56 and 57 will become disengaged from the apertures 58, 59 and 60 and the entire tray including the eggs disposed therein may be removed from the refrigerator and placed on a workbench or the like and the eggs can then be removed from the racks at will. After the eggs are no longer needed the housewife can conveniently and easily replace the rack in its hinged position by causing the tongues 55, 56 and 57 to be received into the apertures 58, 59 and 60 and thereafter the tray can be moved to its closed position as illustrated in full lines in Fig. 4.

It is important to note that when the egg tray is removed from its normal hinged position the shelf-like structure 35 may be used as a tray to support food articles.

Attention is invited to Figs. 2 and 4 wherein there is disclosed a stop means 65 and 66 respectively carried by side walls 33 and 34 and adapted to become engaged with lower portions 67 of the tray when the tray is in its open position so as to restrict further movement of the tray to prevent the same from being opened too far which may result in the eggs contained in the racks 42 and 43 being spilled therefrom.

The instant egg storage compartment and the egg tray incorporated therewith being formed of relatively simple stampings facilitating ease in assembly and maintenance, lends itself to mass production manufacturing principles, thus affording a substantial saving in the manufacturing cost.

From the foregoing disclosure, it may be observed that we have provided an egg storage compartment for a refrigerator which efficiently fulfills the objects thereof as hereinbefore set forth and which provides numerous advantages which may be summarized as follows:

1. Structurally simple, efficient and durable;
2. Economical to manufacture and readily adaptable to mass production manufacturing principles;
3. The provision of an egg storage compartment preferably for disposition on the inner panel of a refrigerator food compartment door and including a tray conveniently and easily removable from said compartment and particularly adapted to support a plurality of eggs in relative nested relationship, said tray having portions thereof adapted as a closure means for said compartment, and said compartment having means whereby circulated refrigerated air may be caused to flow through said compartment and in contact with the eggs disposed therein, said egg compartment being so arranged as to provide cooling of said eggs at a proper storage temperature; and
4. Provision of an egg storage tray so mounted inside the door that when the tray is removed, the mounting means is usable as an extra shelf.

While we have illustrated preferred embodiments of our invention, many modifications may be made without departing from the spirit of our invention, and we do not wish to be limited to the precise details of construction set forth but wish to avail ourselves of all changes within the scope of the appended claims.

We claim:

1. In a refrigerator having a food compartment, a door therefor and a liner for said door, an egg storage compartment incorporated in said door comprising the combination of a chamber provided with an opening, said chamber being defined by a top wall, a rear wall, and a pair of side walls, each of said walls forming an integral part of said liner of the door, a shelf-like structure removably carried by said walls, said shelf-like structure having one wall defining a bottom wall of said compartment and a second wall defining a front wall and adapted to partially enclose said opening, and a tray removably and hingedly carried by said shelf-like structure, said tray including a wall adapted to provide a closure means for said opening, and means arranged whereby circulated air may flow through said compartment.

2. In a refrigerator having a food compartment, a door therefor and a liner for said door, an egg storage compartment incorporated in said door comprising the combination of a chamber provided with an opening, said chamber being defined by a top wall, a rear wall and a pair of side walls, each of said walls forming an integral part of said liner of the door, a shelf-like structure removably carried by said walls, said shelf-like structure having one wall defining a bottom wall of said compartment and a second wall defining a front wall and adapted to partially enclose said opening, and a tray including a wall adapted to provide a closure means for said opening, means on said shelf-like structure for removably and hingedly securing said tray thereto, and means arranged to provide circulation of refrigerated air within said compartment.

3. In a refrigerator having a food compartment, a door therefor and a liner for said door, an egg storage compartment incorporated in said door comprising the combination of a chamber provided with an opening, said chamber being defined by a top wall, a rear wall and a pair of side walls, each of said walls forming an integral part of said liner of the door, a shelf-like structure removably carried by said walls, said shelf-like structure having one wall defining a bottom wall of said compartment and a second wall defining a front wall and adapted to partially enclose said opening, and a tray including a wall adapted to provide a closure means for said opening, means on said shelf-like structure for removably and hingedly securing said tray thereto, said means comprising a plurality of tongues integrally formed on said front wall of said shelf-like structure and adapted to be received into apertures in said tray, and means arranged to provide circulation of refrigerated air within said compartment.

4. In a refrigerator having a food compartment, a door therefor and a liner for said door, an egg storage compartment incorporated in said door comprising the combination of a chamber provided with an opening, said chamber being defined by a top wall, a rear wall and a pair of side walls, each of said walls forming an integral part of said liner of the door, a shelf-like structure removably carried by said walls, said shelf-like structure having one wall defining a bottom wall of said compartment and a second wall defining a front wall and adapted to partially enclose said opening, and a tray including a wall adapted to provide a closure means for said opening, means on said shelf-like structure for removably and hingedly securing said tray thereto, said means comprising a plurality of tongues integrally formed on said front wall of said shelf-like structure and adapted to be received into apertures in said tray, said shelf-like structure being in spaced relationship from said liner and adapted to provide a means for the circulation of refrigerated air into said compartment.

5. In a refrigerator having a food compartment, a door therefor and a liner for said door, an egg storage compartment incorporated in said door comprising the combination of a chamber provided with an opening, said chamber being defined by a top wall, a rear wall and a pair of side walls, each of said walls forming an integral part of said liner of the door, a shelf-like structure removably carried by said walls, said shelf-like structure having one wall defining a bottom wall of said compartment and a second wall defining a front wall and adapted to partially enclose said opening, and a tray including a wall adapted to provide a closure means for said opening, means on said shelf-like structure for removably and hingedly securing said tray thereto, said means comprising a plurality of tongues integrally formed on said front wall of said shelf-like structure and adapted to be received into apertures in said tray, said tray being provided with racks, said racks being adapted to support a plurality of eggs in relative nested relationship when said tray is in a vertical or horizontal position, and means arranged to provide circulation of refrigerated air within said compartment.

6. In a refrigerator having a food compartment, a door therefor and a liner for said door, an egg storage compartment incorporated in said door comprising the combination of a chamber provided with an opening, said chamber being defined by a top wall, a rear wall and a pair of side walls, each of said walls forming an integral part of said liner of the door, a shelf-like structure removably carried by said walls, said shelf-like structure having one wall defining a bottom wall of said compartment and a second wall defining a front wall and adapted to partially enclose said opening, a tray including a wall adapted to provide a closure means for said opening, means on said shelf-like structure for removably and hingedly securing said tray thereto, said shelf-like structure being in spaced relationship from said liner and adapted to provide a means for the circulation of refrigerated air into said compartment, and means defining a recess in said liner and adapted to provide a hand grip for said tray and providing a channel to aid in the circulation of said refrigerated air through said egg storage compartment.

RAYMOND M. TENNEY.
JAMES R. HORNADAY.
DONALD H. REEVES.

References Cited in the file of this patent

UNITED STATES PATENTS

| Number | Name | Date |
| --- | --- | --- |
| 1,528,599 | Belville | Mar. 3, 1925 |
| 1,692,064 | Trogner | Nov. 20, 1928 |
| 2,096,690 | Scofield | Oct. 19, 1937 |
| 2,131,680 | Zahodiakin | Sept. 27, 1938 |
| 2,304,411 | Keighley | Dec. 8, 1942 |
| 2,465,107 | Mascioli | Mar. 22, 1949 |
| 2,525,446 | Carbary | Oct. 10, 1950 |
| 2,562,057 | Norberg | July 24, 1951 |
| 2,565,995 | Spencer | Aug. 28, 1951 |